United States Patent
Han et al.

(10) Patent No.: US 7,434,906 B2
(45) Date of Patent: Oct. 14, 2008

(54) METHOD FOR CONVERTING PRINTING DATA AND DEVICE USING THE SAME

(75) Inventors: Hsiao-Yu Han, Hsinchu (TW); Meng-Fen Lo, Hsinchu (TW); Yao-Wen Huang, Hsinchu (TW); Tung-Lin Wu, Hsinchu (TW); Chieh-Yi Huang, Hsinchu (TW); Jane Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 518 days.

(21) Appl. No.: 11/168,542

(22) Filed: Jun. 29, 2005

(65) Prior Publication Data

US 2006/0139666 A1    Jun. 29, 2006

(30) Foreign Application Priority Data

Dec. 29, 2004    (TW)    ............................... 93141235 A (51) Int. Cl.
*B41J 2/205*    (2006.01)
*B41J 29/38*    (2006.01)

(52) U.S. Cl. .......................................... 347/15; 347/14

(58) Field of Classification Search .................. 347/5, 347/6, 9, 14, 15, 23, 54, 74; 358/1.9, 3.21
See application file for complete search history.

(56) References Cited

U.S. PATENT DOCUMENTS

| 5,480,240 | A | | 1/1996 | Bolsah et al. |
| 5,689,343 | A | * | 11/1997 | Loce et al. ................. 358/3.21 |
| 5,742,300 | A | | 4/1998 | Klassen |
| 5,912,683 | A | | 6/1999 | Eade |
| 6,075,926 | A | | 6/2000 | Atkins et al. |
| 6,118,547 | A | * | 9/2000 | Tanioka ...................... 358/1.9 |
| 6,411,399 | B1 | | 6/2002 | Mantell et al. |
| 2004/0104952 | A1 | * | 6/2004 | Tsuchiya et al. ............. 347/15 |
| 2006/0170716 | A1 | * | 8/2006 | Reyero et al. .................. 347/5 |

* cited by examiner

*Primary Examiner*—Hai C Pham
(74) *Attorney, Agent, or Firm*—Rabin & Berdo, P.C.

(57) ABSTRACT

A method and a device are used to generate print data of any resolutions based on ink volume from the original print data. The print data in the form of halftoned levels are first transferred to the ink image according to the relation between halftone level and drop number obtained by the experiment of ink control. Then, the ink image of original resolution is converted to the ink image of desired resolution by the concept of conservation ink volume per pixel where the amount of ink drops in the unit area stays coherent in the conversion. Finally, each drop number of the converted ink image is transferred to the corresponding halftone level to generate the printing data that can be accepted by the printing device.

10 Claims, 6 Drawing Sheets

METHOD FOR CONVERTING PRINTING DATA AND DEVICE USING THE SAME

BACKGROUND

1. Field of the Invention

The invention relates to a method for converting printing data and a device using the same, which apply to output devices for digital images such as a printer, and in particular to a method for converting printing data and an applied device which directly generates printing data of any resolution and output it.

2. Related Art

With the development of the digital technology, the applications for the digital images are getting broader. Digital images are easy to achieve by digital cameras and scanners. The images are output by an image output equipment such as a digital photo printer in which a memory card slot and a LCD display are included inside. Generally, most kinds of the memory cards shown in the market can be supported so the computer is not the only interface for printing any more. The only thing you need to do to perform print job is plugging the memory card into the slot on the printer and pressing the buttons thereon. The whole procedure becomes much more convenient and faster.

However, digital images usually are composed of trichromatic colors: red (R), green (G), and blue (B) in different proportions. However, a lot of image output devices and displays are not able to produce the enough tints. A digital image must be undergone a color conversion to transfer to a color space for output device before printing. Taking a printer as an example, the color space is formed by cyan (C), magenta (M), and yellow (Y). After that, the image is undergone a down tint process for converting the original multi tints image into a less tints image in order to conform to the characteristics of output devices. This step can be referred to as a halftoning process. The values of the pixels in the halftoning images are responded to drop numbers of the ink. Finally, a halftoning image is converted and output according to the arrangement of the ink nozzles of the printhead for producing a printed image.

Associated with the advancement of the printing systems and printheads, the resolution for printing has been improved from 300 DPI ten years ago to 4800 DPI presently. Generally, the resolution of a digital image is determined at the time of shooting or scanning. The only thing that can be changed during the printing process is the printing resolution. However, the size of a printout is changed with the variation of printing resolution, which means a higher printing resolution gets a smaller image and vice versa. Thus, an additional process is required for outputting an image with a fixed size when the printing resolution is changed. On the other hand, color-related experiments are needed for a printmode with varied resolutions to obtain the relationship between the halftone levels and drop numbers of the ink, which cost a lot of labor and time, especially for a printmode with a higher resolution.

In order to solve the foregoing problems, in the technique disclosed in the U.S. Pat. No. 5,480,240, the original 300 DPI printing data are directly repeated in the horizontal direction to make one dot become two dots. To retain the characteristics of original printing data, a correction process will be performed to the doubled printing data. This correction process is a dot removing process, which prevents two adjacent dots from printing at the same time, and forms the virtual 600 DPI printing data. This method can only achieve the 600 DPI printing in the horizontal direction, and the resolution of the data is not a real 600 DPI according to a strict view.

U.S. Pat. No. 5,742,300 is also for enhancing the printing resolution in the horizontal direction, where the data are firstly doubled in the horizontal direction to make one dot become two dots. And then, a dot removing process is performed to the edge for the blur effect caused by the doubled printing data. For the regions beside the edges, a checkerboard-like mask is used to reduce the amounts of the printing data, which makes the printing ink as similar as possible before and after the resolution enhancement. This method only improves the resolution in the horizontal direction, and an additional image edge detection process makes this process even more complicated.

In addition, U.S. Pat. No. 5,912,683 also provides the method for improving a printing resolution in the horizontal direction. Instead of directly doubling the printing data, a transition table is utilized to replace a dither table in the halftone process. The same pixel in the original image is continuously compared to the two thresholds in the transition table, twice in horizontal direction. Therefore, two halftone outputs are obtained by the same input pixel. This method is limited by using the dithering method to perform the halftone processing, which achieves halftoning images with poor quality and may even cause ink bleeding and color shift due to the increase of the ink drops per area.

In U.S. Pat. No. 6,075,926, duplication or average method is used to increase the dots in the low brightness area, which is less sensitive to human eyes. In the area where the brightness is higher than a threshold value, a table consulting method is used to insert some dots. Firstly, a database including different features of images is produced by experiments where four filter matrixes required by an operation of generating four dots from one dot are represented. In a practical operation, the processing dot is treated as the center of the 9×9 matrix; an eight dimension vector is obtained by subtracting the processing dot from the surrounding eight dots respectively, which is used for searching for one or several sets of filter matrixes in the database by matching operation, which corresponds to the features similar to the processing dot. Finally, the value of the inserting dot is calculated by adding the multiplications of the weighted ratios and the filter matrixes. In this method, the database must be established and stored in the memory when the system is offline. Although a larger database achieves a better image quality, the larger storage size and the longer matching time are needed. On the other hand, different databases are needed for different multiple of resolution conversion, which means a large memory is necessary.

In U.S. Pat. No. 6,411,399, the problem caused by doubling the original printing data according to the desirable printing resolution is mentioned, which is that the amount of ink printed on the medium become double such that the color presentation is even worse. Therefore, the mask changed with the printing position is used to remove the redundant printing data to make the amount of ink remain the same with the variation of resolution. Although this method makes the amount of the ink remain the same, the printing data will be changed with the position. In other words, an ink drop originally located in the center will be dispersed to the surrounding location, which makes the printing quality become worse. In this method, color bleeding still happens as two adjacent dots are printing at a high resolution.

According to the description above, when the image is printed at printmodes with different resolutions, the pre-requited experiments for the relations between the halftone levels and drop numbers of ink must be performed. On the other hand, if images stored in a memory card are printed, the size of the printouts will be changed with the printing resolutions. Thus, a new method for converting the printing data and an applied device are necessary to develop to print images at different resolutions and to save the labors and time required in the color experiments.

SUMMARY

In the view of the problems mentioned above, the object of the invention is to provide a method for converting original printing data with specified resolution to the printing data with any resolutions. No more color-related experiments are needed to do for converting printing data in this method, which saves a lot of labors and time.

Another object of the invention is to provide a device for converting printing data, which converts a specific resolution of the printing data into another resolution for output such that the problems mentioned above can be solved.

To achieve the objects of the invention, a method disclosed in the invention is provided for converting the printing data, comprising the following steps: firstly, receiving an original image with an original resolution; transferring the original image in the form of halftone levels into an ink image, where the values are corresponding to the drop numbers of ink per unit area; equally distributing the ink drops of the image to the corresponding positions of the image with the printing resolution to produce an ink image of the printing resolution; converting the printing ink image into a printing halftone image; outputting the printing halftone image.

In addition, to achieve the objects of the invention, a device for converting the printing data is disclosed in the invention, comprising: an image input unit, an ink drop corresponding unit for the original resolution, an ink balancing unit, and a halftone ink drop processor for the printing resolution. The image input unit is used for producing an original image with the original resolution. The ink drop corresponding unit is used for converting the original image into an ink image in which the ink drops per unit area are shown. The ink balancing unit is used for producing the ink image of the printing resolution where the drop numbers of each location is converted from the value of the corresponding location in the ink drop image of the original resolution to remain the equal amount of ink drops both in the ink images of original resolution and printing resolution. The halftone ink drop processor for the printing resolution is used to transfer the printing ink image into the halftone image for output.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below, which is for illustration only and thus is not limitative of the present invention, wherein.

DETAILED DESCRIPTION

The purpose, construction, features, and functions of the present invention can be appreciated and understood more thoroughly through the following detailed description, with reference to the attached drawings.

The invention provides a method and a device for converting the printing data, which uses the concept of ink drop conservation, to achieve the conversion for the resolution of the printing data.

Figure 1:
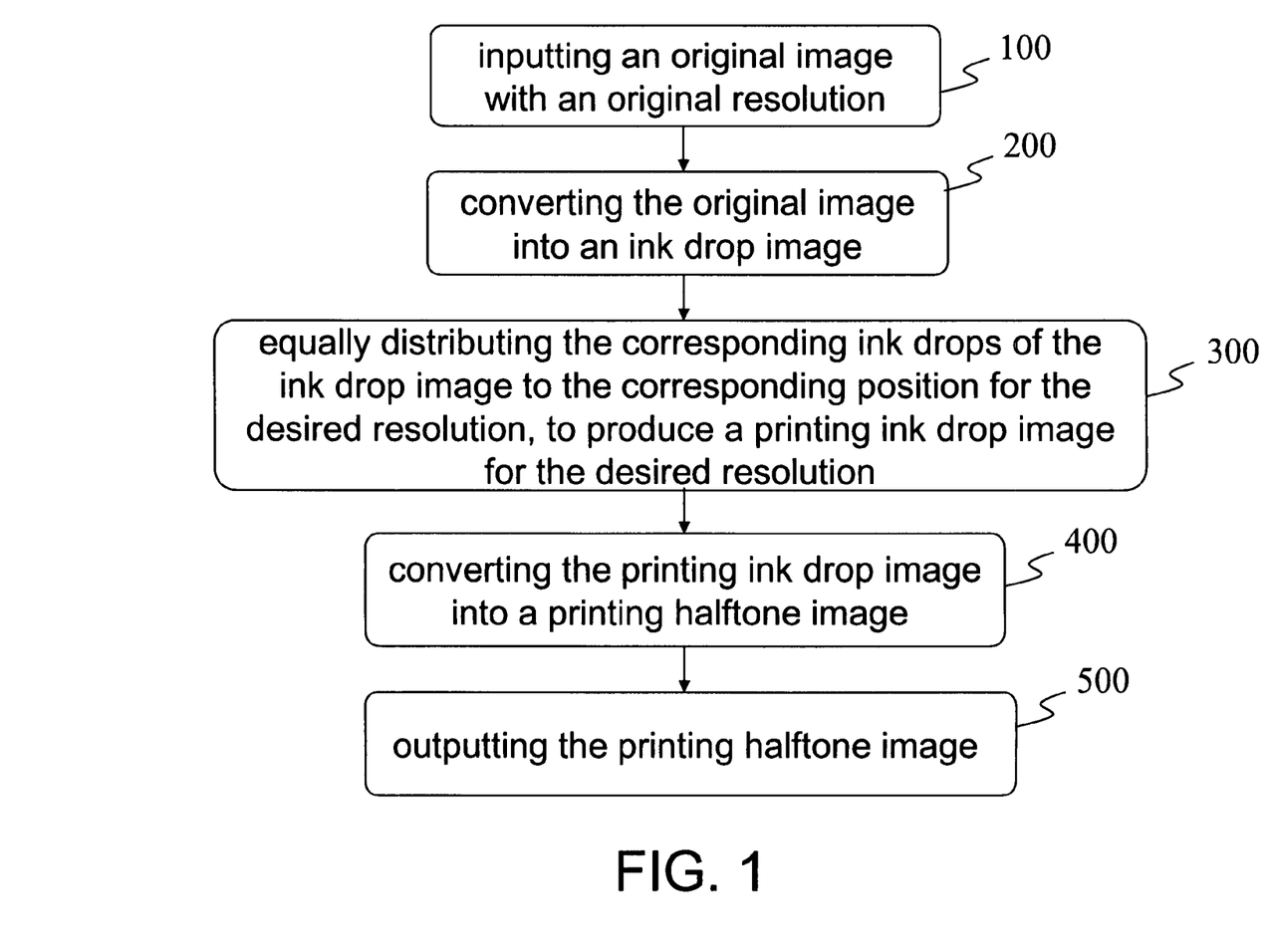
FIG. 1 is a flowchart of a method for converting the printing data according to the invention.

Please refer to FIG. 1, wherein a method for converting printing data is applied to the device for image output, such as a printer according to the invention. This method comprising the steps of: firstly, receiving an original image of the original resolution (step 100); transferring the original image in the form of halftone image into an ink image (step 200), where the corresponding ink drops per area are presented; equally distributing the ink drops of the ink image to the corresponding positions of the printing resolution to produce a printing ink image of the printing resolution (step 300); converting the printing ink drop image into a printing halftone image (step 400); outputting the printing halftone image (step 500).

Figure 2:
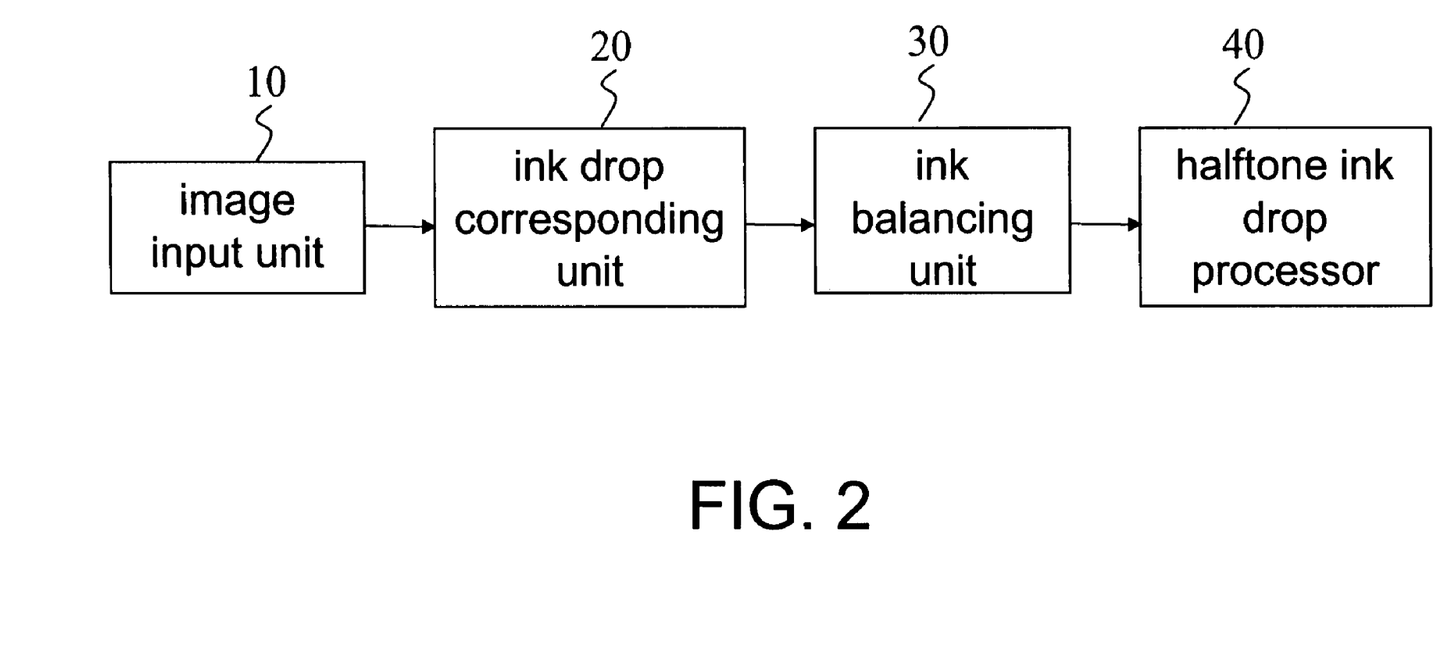
FIG. 2 is a block diagram, showing a device for converting the printing data according to the invention.

In addition, please refer to FIG. 2, according to the method mentioned above, a device for converting printing data provided by the invention, comprising: an image input unit 10, an ink drop corresponding unit 20 for the original resolution, an ink balancing unit 30 and a halftone ink drop processor 40. The ink balancing unit 30 is established by the conversion table obtained by the principle of the coherent of ink drops per unit area in the original image and the printing image. After an original image with an original resolution is input to an image input unit 10, the original image will be transferred into an ink image, where the corresponding ink drops per unit area are generated, by the ink drop corresponding unit 20. The ink balancing unit 30 is then used to convert the ink drops of the ink image to the corresponding positions of the printing image of the printing resolution. Further, a halftone ink drop processor 40 for the printing resolution is used to transfer the ink image into a halftone image for printing.

The basic principle of the invention will be described hereafter.

Assume the resolution of the original image represented by N bits is $VR_{ori}*HR_{ori}$ (step 100), in other words, every pixel of the original image has $2^N$ variations which means that $2^N$ kinds of halftone levels will be shown in the image. In practical printing, different halftone levels correspond to different amounts of ink drops. Table 1 below shows the relationship between the halftone levels and the numbers of corresponding ink drops for the printing in the original resolution. (For the convenience of discrimination, inks drops corresponding to halftone levels of the original resolution and the printing resolution are called "corresponding ink drops" and "converting ink drops" respectively in this specification. Likewise, the halftone images of the original resolution and the printing resolution are called "halftone image" and "printing halftone image" respectively in this specification.)

TABLE 1

| Halftone Level | Encoding (N bits) | The number of corresponding ink drops |
|---|---|---|
| 0 | 00...0 | 0 |
| 1 | 00...1 | . |
| . | . | . |
| . | . | . |
| . | . | . |
| $2^N - 1$ | 11...1 | M |

Assume the desired resolution for output is $VR_{new}*HR_{new}$, that is, the printing resolution of the original image is converted from the original resolution $V_{ori}*HR_{ori}$ to the desired resolution $VR_{new}*HR_{new}$. The relationship between the printing halftone levels and the amounts of converting ink drops must be obtained first. In theory, without changing the inks and the used papers, no matter what resolution we choose to print, the amount of ink drops in unit area should stay coherent. According to the equation (1), the relationship between a pixel of the original image and a pixel of the printing image can be calculated. This relationship is called the Conversion Ratio.

$$CR = \frac{VR_{new} * HR_{new}}{VR_{ori} * HR_{ori}} \qquad (1)$$

A pixel of the original image is treated as a unit area, and equals to the CR pixels in the printing image of the desired resolution. According to the concept of equalizing the sum of ink drops within the unit area, the sum of the printing ink drops within the CR pixels in the printing image can be obtained. That is, there are at most $2^N$ variations of corresponding ink drops within the CR pixels in the printing image. These $2^N$ variations of corresponding ink drops can be read from Table 1, and the number of the corresponding ink drops is divided by the CR value to obtain the number of converting ink drops. Then the corresponding ink drops shown in the ink image are equally distributed to each pixel inside the CR pixels, such that all possible combinations of the number of the converting ink drops for a pixel can be obtained by statistical method. Table 2 is a conversion table for the halftone levels of the original resolution, and the number of converting ink drops per pixel of the desired resolution.

TABLE 2

| | Original Resolution | Desired Resolution | |
|---|---|---|---|
| Halftone Level | The number of corresponding ink drops per pixel | The number of converting ink drops per unit area | The number of converting ink drops per pixel |
| 0 | 0 | 0 | 0 |
| 1 | . | . | . |
| . | . | . | . |
| . | . | . | . |
| . | . | . | . |
| $2^N - 1$ | M | M | M/CR |

In the printing at desired resolution, the number of converting ink drops per pixel is 0 at least and M/CR at most. There are P kinds of numbers of the converting ink drops from 0 to M/CR in numerical order. Thus, Q bits required in encoding the P kinds of number of converting ink drops can be calculated from equation (2) where the function MAXINT( ) means to obtain the maximum integer. In other words, each pixel of the printing halftone image at the desired resolution can be represented by Q bits. Therefore, the relationship between the printing halftone levels and the numbers of the converting ink drops at desired resolution is obtained, as shown in Table 3. This relationship can be provided for encoding the printing halftone image of the desired resolution.

$$Q = MAXINT(\sqrt{P}) \qquad (2)$$

TABLE 3

| Halftone Level | Encoding (Q bits) | The number of converting ink drops per pixel |
|---|---|---|
| 0 | 00...0 | 0 |
| 1 | 00...1 | . |
| . | . | . |
| . | . | . |
| . | . | . |
| P - 1 | 11...1 | M/CR |

Next, a further description of how to use a method and a device of the invention for accomplishing the conversion of the printing data of the resolution and outputting the printing data are disclosed.

Firstly, an image input unit 10 of a printing data conversion device is used to input an original image with the original resolution (step 100). Then an ink drop corresponding unit 20 is used to convert the pixel values of the halftone image into the corresponding ink drops. After all pixels are converted by this process, an ink image of the original resolution is obtained, which is a halftone image represented by the corresponding ink drops (step 200). (For the convenience of discrimination, an ink image of the original resolution and an ink image of the desired resolution are called "ink image" and "printing ink image" respectively in the following paragraph.)

Further, the conversion table of the ink balancing unit 30 is used to convert every pixel of the ink image of the original resolution to the CR pixels pixel by pixel according to the conversion ratio (CR) which is the ratio of the desired resolution to the original resolution. The number of ink drops in the CR pixels must equal to the number of ink drops in a corresponding pixel of the ink image, therefore these numbers of corresponding ink drops must be divided by the CR value to obtain the number of converting ink drops. In other words, ink drops per pixel in the ink image are distributed to the CR amount of pixels. After the conversions for all pixels are completed, a printing ink image of the desired resolution is obtained (step 300).

Finally, the halftone ink drop processor 40 for the desired resolution is used to convert the printing ink drops into the halftone levels, such that a printing halftone image of the desired resolution is obtained (step 400) and ready to be encoded. This halftone image of desired resolution may be output to a printing device for printing (step 500).

A preferred embodiment is used below to describe a method and a device for converting the printing data, the operation, and how to achieve the advantages of the invention.

In this preferred embodiment, the data of the original image of the original resolution 300*300 DPI represented by 8 bits is input by the image input unit 10 (step 100). In other words, the range of the pixel value is from 0 to 255. The halftone output is encoded by 2 bits: 00, 01, 10 or 11. The relationship between the halftone levels and the number of corresponding ink drops is shown in Table 4, wherein 00 means 0 corresponding ink drop should be localized on the pixel for printing; 01 means 4 corresponding ink drops should be localized on the pixel for printing; 10 means 8 ink drops should be localized on the pixel for printing; and 11 means 12 corresponding ink drops should be localized on the pixel for printing.

TABLE 4

| Halftone Level | Encoding (2 bits) | The number of corresponding ink drops |
|---|---|---|
| 0 | 00 | 0 |
| 1 | 01 | 4 |
| 2 | 10 | 8 |
| 3 | 11 | 12 |

Figure 3:
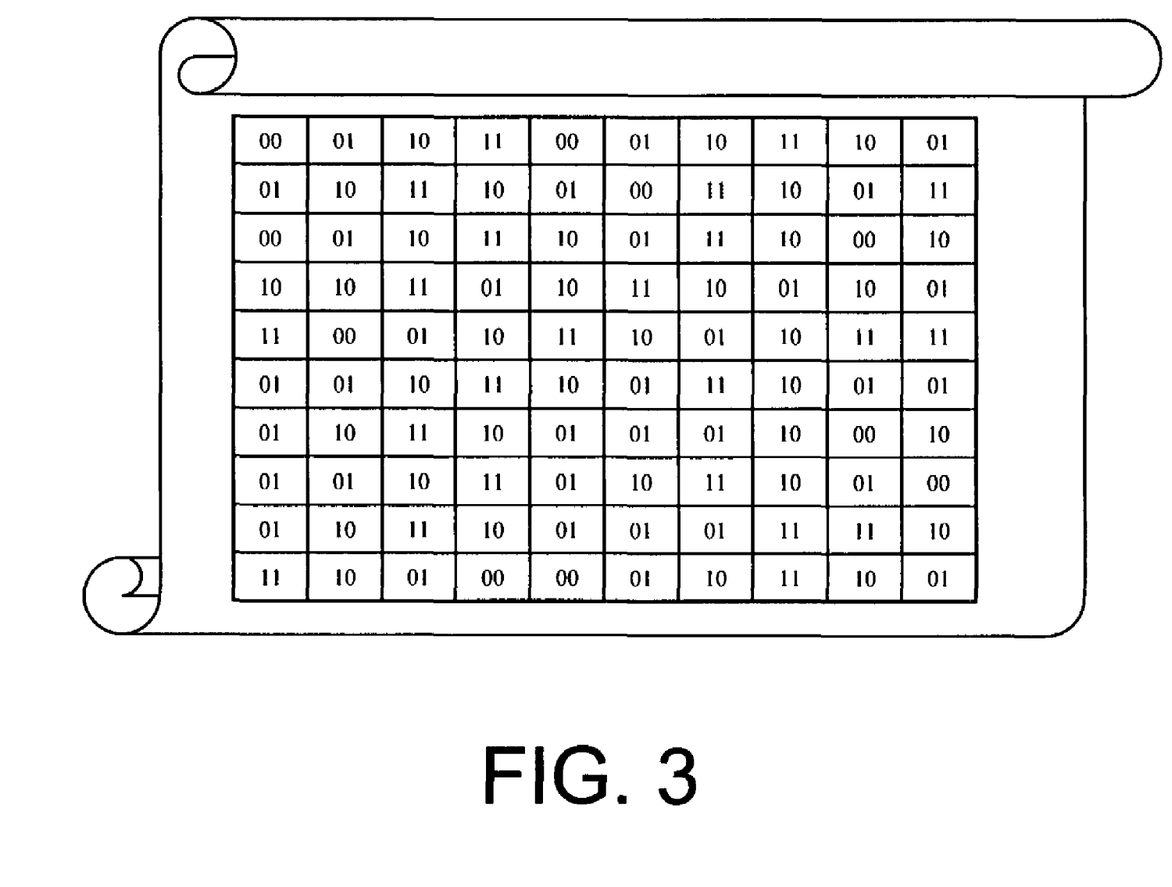
FIG. 3 is an original image of printing resolution 300*300 DPI in the form of halftone levels according to the embodiment of the invention.
Figure 4:
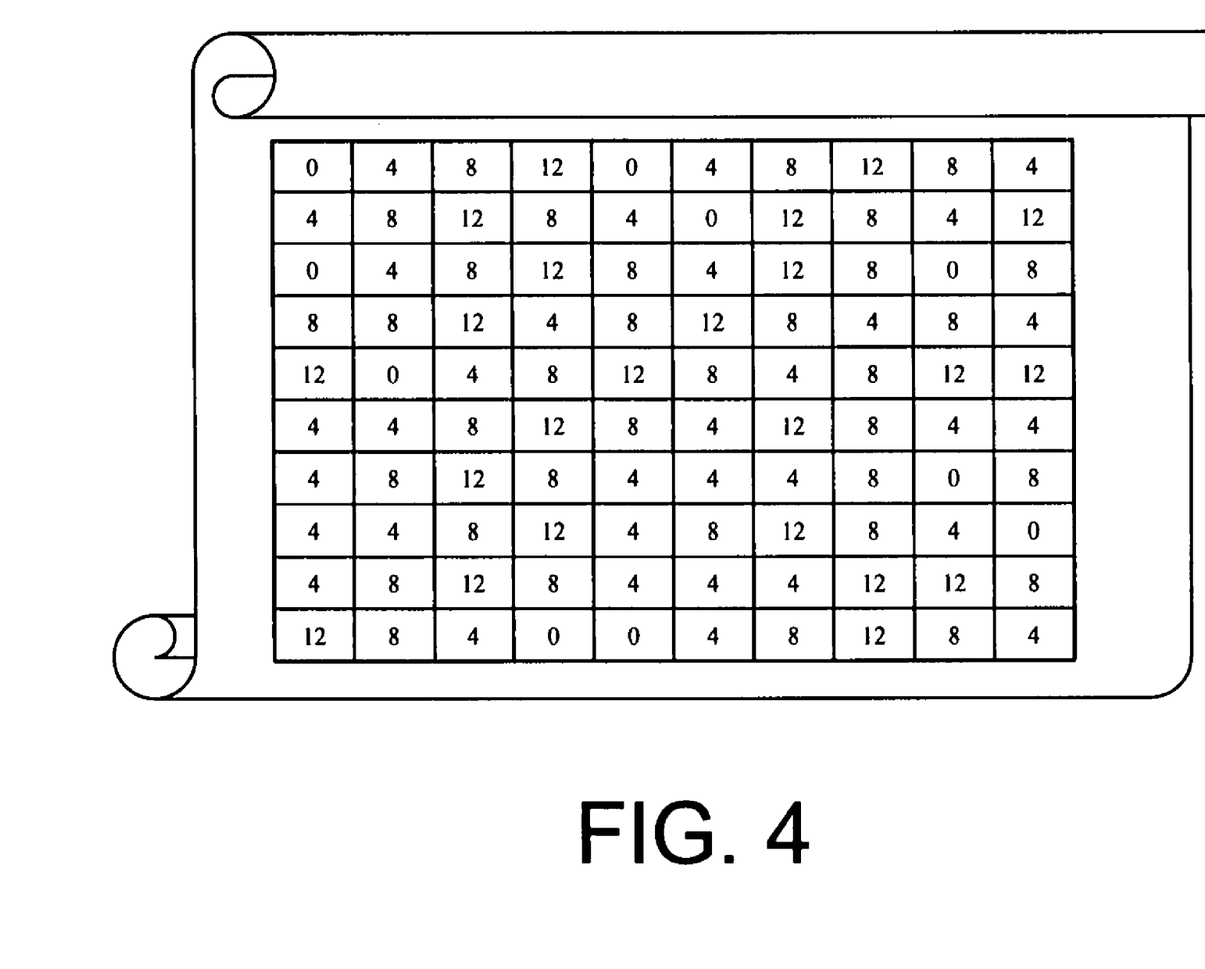
FIG. 4 is an ink image for printing in resolution 300*300 DPI according to the embodiment of the invention.

As shown in FIG. 3, the size of the original image is 10*10 pixels. In the image, the number on the pixel means the halftone level after encoded. After the halftone image shown in FIG. 3 is transferred to the corresponding ink drops by Table 4 of the ink drop corresponding unit 20, an ink image is obtained as shown in FIG. 4 (step 200).

If the original image is printed by 600*600 DPI, the first thing is to obtain the table about the relationship of the halftone levels and the number of converting ink drops for the 600*600 DPI. The CR value is 4 which is calculated from the equation (1). It means that one pixel at 300*300 DPI equals to four pixels at 600*600 DPI. One pixel at 300*300 DPI is considered as a unit area. Due to the amount of ink drops in a unit area never changes, the number of ink drops in the CR pixels at 600*600 DPI is the same as the number of ink drops in the unit area at 300*300 DPI. The number of converting ink drops is obtained by dividing the number of corresponding ink drops by the CR value. Thus, the relation between the number of the converting ink drops per pixel and the number of corresponding ink drops per pixel is built in Table 5.

TABLE 5

| | Resolution: 300 * 300 DPI | Resolution: 600 * 600 DPI | |
|---|---|---|---|
| Halftone Level | The number of corresponding ink drops per pixel | The number of converting ink drops per unit area | The number of converting ink drops per pixel |
| 0 | 0 | 0 | 0 |
| 1 | 4 | 4 | 1 |
| 2 | 8 | 8 | 2 |
| 3 | 12 | 12 | 3 |

Figure 5:
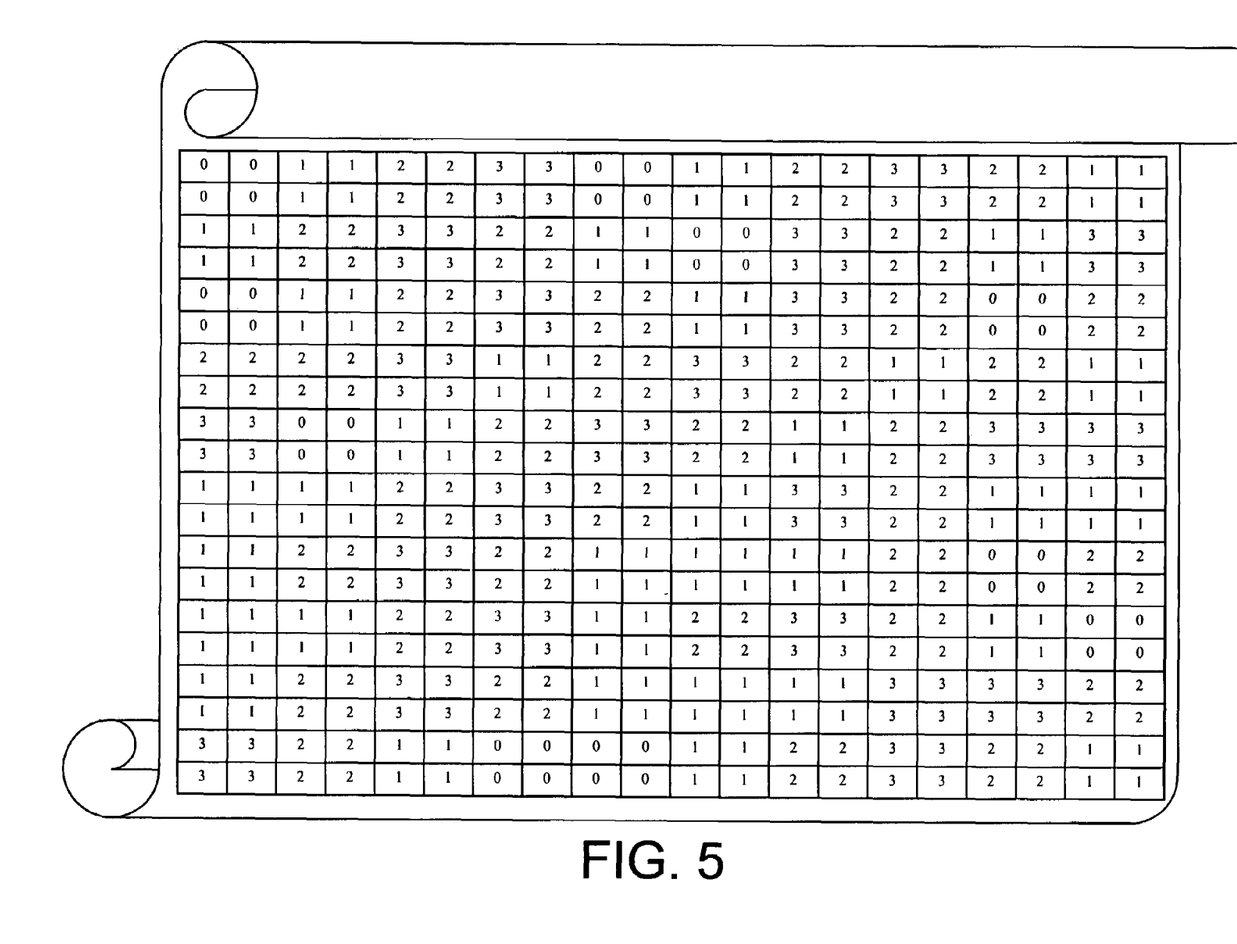
FIG. 5 is a printing ink image for printing in resolution 600*600 DPI according to the embodiment of the invention.

Next, according to the ink drop conversion table (Table 5), each pixel in the ink drop image at 300*300 DPI is converted to four pixels at 600*600 DPI by the ink balancing unit 30. The number of the converting ink drops within the four pixels is the same as the number of corresponding ink drops of one pixel at the original 300*300 DPI. In other words, ink drops per pixel at 300*300 DPI are distributed to four pixels at 600*600 DPI averagely. After all conversions of the pixels in the original image are completed, a printing ink image of 600*600 DPI can be obtained, as shown in FIG. 5 (step 300).

With the desired resolution 600*600 DPI, the number of ink drops printing on one pixel is 0 at least and 3 at most. There are four different numbers of ink drops so the number of bits required for these four different numbers of ink drops is 2, which is obtained from the equation (2). Therefore, each pixel of the printing halftone image for 600*600 DPI can be represented by 2 bits, such that a corresponding table about the relation between the halftone level and the number of converting ink drops can be obtained from 600*600 DPI, as shown in Table 6. This corresponding table is provided for encoding the printing halftone image for 600*600 DPI (step 400).

TABLE 6

| Halftone Level | Encoding (2 bits) | The number of converting ink drops |
|---|---|---|
| 0 | 00 | 0 |
| 1 | 01 | 1 |
| 2 | 10 | 2 |
| 3 | 11 | 3 |

Figure 6:
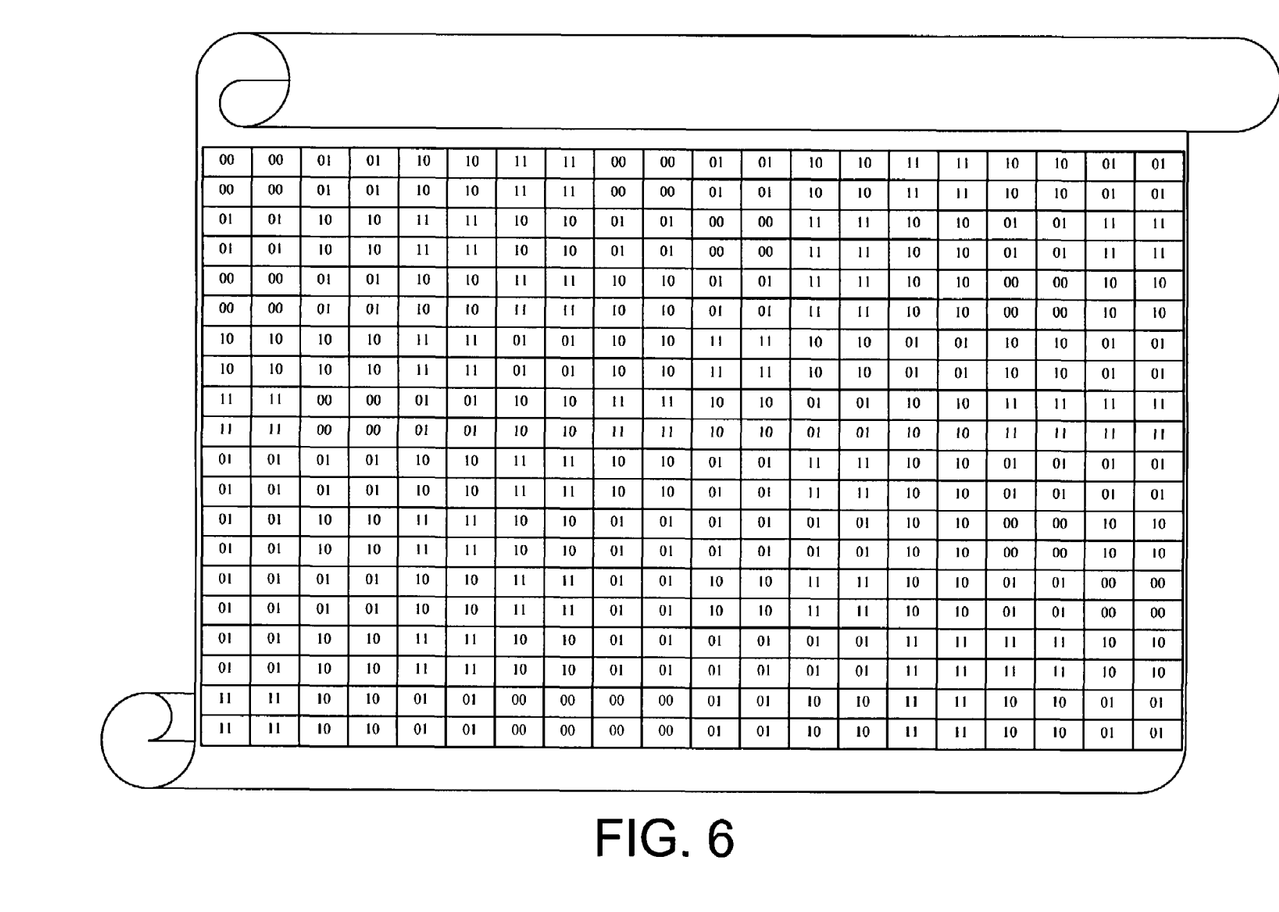
FIG. 6 is a printing halftoning image for printing in resolution 600*600 DPI according to the embodiment of the invention.

Finally, the printing ink image is processed by Table 6 of the halftone ink drop processor 40 to output a corresponding halftone image for the printing device as shown in FIG. 6. This printing halftone image is provided for printing in 600*600 DPI (step 500).

In addition, although the converting number of ink drops calculated from the corresponding ink drops in the ink balancing unit 30 is not an integer, the equalization principle also must be conformed, which means that the number of ink drops per CR pixels at the desired resolution must be the same as the number of ink drops per pixel at the original resolution. Under this situation, the numbers of ink drops in the CR pixels are not equal to each other, therefore part of the CR pixels are set to the value larger than the number of converting ink drops, and part of the CR pixels are set to the value smaller than the number of converting ink drops. For example, if a corresponding number of ink drops deposited on one pixel of the original resolution 300*300 DPI is 1, the CR will be 4 for printing in the desired resolution 600*600 DPI. At this time, it is not possible to distribute one ink drop to 4 pixels; however, the equalization principle also must be conformed. Thus one possible distribution of the number of the converting ink drops for these four pixels at 600*600 DPI can be 1, 0, 0, and 0.

In summary, a method and a device for converting the printing data according to the invention is provided, which are used for printing in different printing resolutions. During the process, the halftone image can be obtained by the conversion without any color-related experiments. In this converting mechanism, an image can be printed in an arbitrary resolution.

Compared to the methods of prior arts, in most of their methods, the printing resolution only can be changed in the horizontal direction, and only conversion from the low resolution to the high resolution are performed. In addition, most of the conversion ratio in their method is 2; however, in the method of the invention, the conversion ratio is not limited, and no matter the conversion is from high resolution to low resolution or vice versa, the conversion can be performed.

Further, the contents of the invention are certified by the experiments. Compared to the original image, the image converted the resolution of printing data by this method maintains the same printing quality and the same color as the original one. Therefore, this invention satisfies the requirements for being new, convenient and non-obvious.

While the preferred embodiments of the invention have been set forth for the purpose of disclosure, modifications of the disclosed embodiments of the invention as well as other embodiments thereof may occur to those skilled in the art.

Accordingly, the appended claims are intended to cover all embodiments, which do not depart from the spirit and scope of the invention.

What is claimed is:

1. A method for converting a printing data, comprising:
receiving an original image with an original resolution;
converting the original image to an ink drop image, wherein a pixel value of the ink drop image is represented by a corresponding number of ink drops per unit area;
equally distributing the corresponding number of ink drops of the ink drop image to a corresponding position for a desired resolution to produce a printing ink drop image corresponding to the new resolution, where the number of ink drops of the printing ink drop image is equal to the number of ink drops of the ink drop image;
converting the printing ink drop image to a printing halftone image; and
outputting the printing halftone image,
wherein the step of equally distributing comprises:
dividing the number of corresponding ink drops by a ratio of the desired resolution to the original resolution to obtain a number of converting ink drops, and
equally distributing the converting ink drops at corresponding positions for the desired resolution to form the printing ink drop image,
wherein when the number of converting ink drops is not an integer, the sum of ink drops deposited on the corresponding positions for the desired resolution and the sum of ink drops for the original resolution must be equal.

2. The method of claim 1, wherein the original image is represented by halftone levels.

3. The method of claim 1, wherein part of the number of ink drops of the ink drop image is set to the value larger than the number of the converting ink drops, and the remaining part of the number of ink drops of the ink drop image is set to the value smaller than the number of the converting ink drops.

4. The method of claim 1, wherein the step of equally distributing further comprises referring to an ink drop converting table.

5. A method for converting a printing data, comprising:
receiving an original image with an original resolution;
converting the original image to an ink drop image, wherein a pixel value of the ink drop image is represented by a corresponding number of ink drops per unit area;
equally distributing the corresponding number of ink drops of the ink drop image to a corresponding position for a desired resolution to produce a printing ink drop image corresponding to the new resolution, where the number of ink drops of the printing ink drop image is equal to the number of ink drops of the ink drop image;
converting the printing ink drop image to a printing halftone image; and
outputting the printing halftone image,
wherein the step of equally distributing comprises referring to an ink drop converting table established by a principle of maintaining the sum of ink drops on corresponding positions for the desired resolution as equal as the sum of ink drops for the original resolution.

6. A device for converting printing data, comprise:
an image input unit for receiving an original image with an original resolution;
an ink drop corresponding unit, which is used for converting the original image to an ink drop image, wherein pixels of the original image have pixel values that are represented by a corresponding number of ink drops per unit area in the ink drop image;
an ink balancing unit, which converts the ink drop image to a printing ink drop image having a desired resolution, wherein the total number of ink drops is the same in the ink drop image and the printing ink drop image, and wherein the ink balancing unit divides the number of corresponding ink drops per unit area in the ink drop image by a ratio of the desired resolution to the original resolution to obtain a number of converting ink drops, which are then distributed to corresponding positions for the desired resolution to form the printing ink drop image; and
a halftone ink drop processor, which is used for transferring the printing ink drop image into a halftone image for output,
wherein when the number of converting ink drops is not an integer, the sum of ink drops deposited on the corresponding positions for the desired resolution and the sum of ink drops for the original resolution must be equal.

7. The device of claim 6, wherein the original image is represented by halftone levels.

8. The device of claim 6, wherein part of the number of ink drops of the ink drop image is set to the value larger than the number of the converting ink drops, and the remaining part of the number of ink drops of the ink drop image is set to the value smaller than the number of the converting ink drops.

9. The device of claim 6, wherein the ink balancing unit comprises an ink drop converting table.

10. The method of claim 9, wherein the ink drop converting table is established by a principle of maintaining the sum of ink drops on corresponding positions for the desired resolution as equal as the sum of ink drops for the original resolution.

* * * * *